United States Patent
Kitamura et al.

(10) Patent No.: US 10,656,597 B2
(45) Date of Patent: May 19, 2020

(54) AUTHENTICITY DETERMINATION DEVICE AND METHOD FOR SECURITY MEDIUM INCLUDING REFLECTIVE VOLUME HOLOGRAM, AND SECURITY MEDIUM INCLUDING REFLECTIVE VOLUME HOLOGRAM

(71) Applicant: Dai Nippon Printing Co., Ltd., Tokyo (JP)

(72) Inventors: Mitsuru Kitamura, Tokyo (JP); Tsuyoshi Yamauchi, Tokyo (JP); Koji Eto, Tokyo (JP); Nobuko Oikawa, Tokyo (JP); Tomoe Sato, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/517,362

(22) PCT Filed: Sep. 7, 2015

(86) PCT No.: PCT/JP2015/075369
§ 371 (c)(1),
(2) Date: Apr. 6, 2017

(87) PCT Pub. No.: WO2016/067755
PCT Pub. Date: May 6, 2016

(65) Prior Publication Data
US 2017/0308036 A1    Oct. 26, 2017

(30) Foreign Application Priority Data
Oct. 30, 2014 (JP) ................. 2014-221705

(51) Int. Cl.
*G03H 1/00*      (2006.01)
*G06K 7/10*      (2006.01)
*B42D 25/328*    (2014.01)
*G03H 1/02*      (2006.01)
*G07D 7/12*      (2016.01)
(Continued)

(52) U.S. Cl.
CPC ......... *G03H 1/0011* (2013.01); *B42D 25/328* (2014.10); *G03H 1/02* (2013.01);
(Continued)

(58) Field of Classification Search
None
See application file for complete search history.

(56) References Cited

U.S. PATENT DOCUMENTS

| 6,765,704 B2 * | 7/2004 | Drinkwater | .......... G03H 1/0011 283/72 |
| 7,264,169 B2 * | 9/2007 | Juds | .................... G06K 7/10732 235/462.01 |

(Continued)

FOREIGN PATENT DOCUMENTS

| JP | 03-188481 A1 | 8/1991 |
| JP | 04-317190 A1 | 11/1992 |

(Continued)

OTHER PUBLICATIONS

International Search Report and Written Opinion (Application No. PCT/JP2015/075369) dated Dec. 1, 2015.

*Primary Examiner* — Jennifer D. Carruth
(74) *Attorney, Agent, or Firm* — Burr & Brown, PLLC

(57) ABSTRACT

To provide an authentication device and method for a security medium including a reflective volume hologram having a light source disposed on the front surface side of the reflective volume hologram so that light emitted therefrom is incident on the reflective volume hologram, a first observation device disposed in a pre-designed diffraction direction of the reflective volume hologram, and a second observation device disposed in a direction other than the pre-designed diffraction direction of the reflective volume hologram. Light including a pre-designed diffraction wavelength is emitted from the light source to be incident on the reflective volume hologram, and when the light amount
(Continued)

observed in the first observation device is larger in the diffraction wavelength than in other wavelengths, and the light amount observed in the second observation device is smaller in the diffraction wavelength than in other wavelengths, it is determined that the reflective volume hologram is genuine.

12 Claims, 15 Drawing Sheets

(51) Int. Cl.
  *G03H 1/18* (2006.01)
  *G03H 1/04* (2006.01)
(52) U.S. Cl.
  CPC ............ *G03H 1/0248* (2013.01); *G03H 1/18* (2013.01); *G06K 7/10* (2013.01); *G07D 7/12* (2013.01); *G03H 2001/0415* (2013.01)

(56) References Cited

U.S. PATENT DOCUMENTS

| | | | | |
|---|---|---|---|---|
| 8,728,685 B2 * | 5/2014 | Burns | ...................... | G03H 1/22 359/3 |
| 2003/0019931 A1 * | 1/2003 | Tsikos | .................... | G02B 26/10 235/454 |
| 2004/0121241 A1 * | 6/2004 | Kodama | .............. | G03H 1/0248 430/1 |
| 2005/0139792 A1 * | 6/2005 | Rivera | ............... | G01N 21/8903 250/559.45 |
| 2007/0211318 A1 * | 9/2007 | Miura | .................. | G03H 1/2286 359/2 |
| 2007/0216975 A1 * | 9/2007 | Holmes | .................. | G03H 1/041 359/2 |
| 2007/0291339 A1 | 12/2007 | Kumasawa | | |
| 2010/0165425 A1 * | 7/2010 | Tompkin | .................. | B44F 1/10 359/2 |
| 2010/0208313 A1 * | 8/2010 | Horgan | ................ | G03H 1/0005 359/2 |
| 2013/0099474 A1 * | 4/2013 | Fuhse | .................... | B42D 15/00 283/85 |

FOREIGN PATENT DOCUMENTS

| | | |
|---|---|---|
| JP | 04-340583 A1 | 11/1992 |
| JP | 07-021335 A1 | 1/1995 |
| JP | 2007-093779 A1 | 4/2007 |
| JP | 2007-268896 A1 | 10/2007 |
| JP | 2010-261744 A1 | 11/2010 |

* cited by examiner

AUTHENTICITY DETERMINATION DEVICE AND METHOD FOR SECURITY MEDIUM INCLUDING REFLECTIVE VOLUME HOLOGRAM, AND SECURITY MEDIUM INCLUDING REFLECTIVE VOLUME HOLOGRAM

TECHNICAL FIELD

The present invention relates to an authenticity determination device and method for a security medium including a reflective volume hologram which has wavelength selectivity and angle selectivity and which is stuck to, transferred to, or embedded in an article or the like to prevent counterfeiting of the article and to a security medium including the reflective volume hologram.

BACKGROUND ART

Conventionally, various types of anti-counterfeiting technology are used for articles requiring authentication and counterfeit prevention, such as cards (cash card, credit card, check card, etc.), gold notes, identifications, and important documents. For example, as the anti-counterfeiting technology, special inks such as optically variable ink and fluorescence ink, a hologram and the like are available. In addition to the anti-counterfeit technology, an authenticity determination method for detection and authentication of the anti-counterfeiting technology is used to perform authenticity determination using the anti-counterfeiting technology. To perform the authenticity determination more conveniently, an authenticity determination device using the authenticity determination method is used.

The hologram used in the anti-counterfeiting technology is a medium obtained by recording wavefront information of an object light on a photosensitive material as interference fringes by making two coherent lights (object light and reference light) interfere with each other. When the hologram is illuminated with a light close to a reference light at the time of interference fringes recording, a diffraction phenomenon due to the interference fringes occurs, whereby a wavefront close to the original object light can be reproduced. Such a hologram is classified into several types (relief hologram, volume hologram, etc.) depending on a recording form of the interference fringes.

The relief hologram (relief-type hologram) is a hologram obtained by shaping interference fringes generated by interference of light as a fine uneven pattern on a hologram layer surface. The volume hologram (volume type hologram) is a hologram obtained by three-dimensionally recording interference fringes generated by interference of light in the thickness direction as fringes having different refractive indices or transmittances inside a hologram layer.

In the volume hologram, the interference fringes are three-dimensionally recorded in the thickness direction of a recording material, so that a light satisfying a condition on a waveform and a light path direction, which is called "Bragg condition" is diffracted with high diffraction efficiency. That is, the volume hologram has wavelength selectivity and angle selectivity that diffract a specific wavelength at a specific angle. The volume hologram can be roughly classified into a reflective type and a transmissive type depending on the diffraction direction of light. The reflective volume hologram has stronger wavelength selectivity than that of the transmissive volume hologram, so that the wavelength of a reflected/diffracted light is limited to a narrow range (specific color).

Conventionally, as the technology to detect and authenticate the volume hologram, there is disclosed a technology that irradiates a volume hologram laminate with an inspection light having a wavelength different from a specific wavelength of a volume hologram layer or with an inspection light having an angle different from a specific angle of the volume hologram layer so as to stably detect defects of the volume hologram laminate with high accuracy (see Patent Literature 1).

CITATION LIST

Patent Literature

Patent Literature 1: JP 2010-261744A

SUMMARY OF INVENTION

Technical Problem

However, the technology disclosed in Patent Literature 1 merely detects defects of the volume hologram laminate, but is not configured to perform authenticity determination and to prevent counterfeiting of an article.

The object of the present invention is to provide an authentication device and method for a security medium including a reflective volume hologram, capable of easily performing authentication determination and a security medium including the reflective volume hologram.

Solution to Problems

To attain the above object, according to the present invention, there is provided an authenticity determination device for a security medium including a reflective volume hologram including: a light source disposed on the front surface side of the reflective volume hologram so that light emitted therefrom is incident on the reflective volume hologram; a first observation device disposed in a pre-designed diffraction direction of the reflective volume hologram; and a second observation device disposed in a direction other than the pre-designed diffraction direction of the reflective volume hologram. Light including a pre-designed diffraction wavelength is emitted from the light source to be incident on the reflective volume hologram, and at this time, when the light amount observed in the first observation device is larger in the diffraction wavelength than in other wavelengths, and the light amount observed in the second observation device is smaller in the diffraction wavelength than in other wavelengths, it is determined that the reflective volume hologram is genuine.

Further, in the authenticity determination device for a security medium including a reflective volume hologram according to the present invention, the light source is disposed so that light is incident on the reflective volume hologram from a pre-designed incident direction of the reproduction illumination light of the reflective volume hologram.

Further, in the authenticity determination device for a security medium including a reflective volume hologram according to the present invention, the second observation device is disposed in the direction in which light emitted from the light source goes straight and is then transmitted through the reflective volume hologram.

Further, in the authenticity determination device for a security medium including a reflective volume hologram according to the present invention, the security medium includes a scattering transmitting member which is a transparent member, which has a function of, when light emitted from the light source is transmitted therethrough, scattering and emitting the transmitted light, and which is disposed side by side with the reflective volume hologram.

Further, in the authenticity determination device for a security medium including a reflective volume hologram according to the present invention, the second observation device is disposed on the side opposite to the light source with respect to the reflective volume hologram and scattering transmitting member.

Further, in the authenticity determination device for a security medium including a reflective volume hologram according to the present invention, the security medium includes a scattering reflecting member which is an opaque member, which has a function of, when light emitted from the light source is reflected thereat, scattering and emitting the reflected light, and which is disposed side by side with the reflective volume hologram.

Further, in the authenticity determination device for a security medium including a reflective volume hologram according to the present invention, the light source is disposed on the front surface side of the reflective volume hologram so that a reproduction light to be irradiated is incident on the reflective volume hologram from a direction other than a pre-designed diffraction direction of the reflective volume hologram.

Further, in the authenticity determination device for a security medium including a reflective volume hologram according to the present invention, the light source is disposed on the front surface side of the reflective volume hologram so that a reproduction light to be irradiated is incident on the reflective volume hologram from the pre-designed incident direction of the reflective volume hologram.

Further, in the authenticity determination device for a security medium including a reflective volume hologram according to the present invention, the second observation device is disposed in the pre-designed incident direction of the reflective volume hologram.

Further, according to the present invention, there is provided an authenticity determination method for a security medium including a reflective volume hologram including: a first step of moving the reflective volume hologram so that light including a pre-designed diffraction wavelength of the reflective volume hologram which is emitted from a light source and incident on the reflective volume hologram is the reproduction illumination light of the reflective volume hologram and observing the light from a pre-designed diffraction direction of the reflective volume hologram; and a second step of moving the reflective volume hologram so that light including the pre-designed diffraction wavelength of the reflective volume hologram which is emitted from the light source and incident on the reflective volume hologram is transmitted through the reflective volume hologram and observing the light from the side opposite to the light source with respect to the reflective volume hologram. When it is determined in the first step that the light amount in the diffraction wavelength is larger than that in other wavelengths and it is determined in the second step that the light amount in the diffraction wavelength is smaller than that in other wavelengths, the reflective volume hologram is determined to be genuine.

Further, in the authenticity determination method for a security medium including a reflective volume hologram according to the present invention, the security medium includes a scattering transmitting member which is a transparent member, which has a function of, when light including a pre-designed diffraction wavelength of the reflective volume hologram emitted from a light source is transmitted therethrough, scattering and emitting the transmitted light, and which is disposed side by side with the reflective volume hologram. The method includes: a first step of moving the reflective volume hologram so that the light including the pre-designed diffraction wavelength of the reflective volume hologram which is emitted from the light source and incident on the reflective volume hologram is the reproduction illumination light of the reflective volume hologram and observing the light from a pre-designed diffraction direction of the reflective volume hologram; and a second step of moving the reflective volume hologram so that the light which is emitted from the light source which is a white light source and incident on the reflective volume hologram is transmitted through the reflective volume hologram and observing the light from the side opposite to the light source with respect to the reflective volume hologram. When it is determined in the first step that the light amount in the diffraction wavelength is larger than that in other wavelengths and it is determined in the second step that the light amount in the diffraction wavelength is smaller than that in other wavelengths, the reflective volume hologram is determined to be genuine.

Further, in the authenticity determination method for a security medium including a reflective volume hologram according to the present invention, the security medium includes a scattering reflecting member which is an opaque member, which has a function of, when light including a pre-designed diffraction wavelength of the reflective volume hologram emitted from a light source is reflected thereat, scattering and emitting the reflected light, and which is disposed side by side with the reflective volume hologram. The method includes: a first step of observing, from a pre-designed diffraction direction of the reflective volume hologram, the light which is emitted from the light source in a pre-designed incident direction of the reproduction illumination light of the reflective volume hologram; and a second step of observing, from the pre-designed incident direction of the reproduction illumination light of the reflective volume hologram, the light which is emitted from the light source in the pre-designed incident direction of the reproduction illumination light of the reflective volume hologram. When it is determined in the first step that the light amount in the diffraction wavelength is larger than that in other wavelengths and it is determined in the second step that the light amount in the diffraction wavelength is smaller than that in other wavelengths, the reflective volume hologram is determined to be genuine.

Further, in the authenticity determination method for a security medium including a reflective volume hologram according to the present invention, the second step observes, from the pre-designed incident direction of the reproduction illumination light of the reflective volume hologram, light emitted from the light source other than that in an emission direction of a diffracted light when the pre-designed reproduction illumination light of the reflective volume hologram is incident on the reflective volume hologram.

Further, according to the present invention, there is provided a security medium including a reflecting volume hologram, including: a transparent reflective volume hologram; and a scattering transmitting member which is a transparent member, which has a function of, when light emitted from a light source is transmitted therethrough, scattering and emitting the transmitted light, and which is disposed side by side with the reflective volume hologram on the side opposite to the light source with respect to the reflective volume hologram.

Further, according to the present invention, there is provided a security medium including a reflecting volume hologram, including: a transparent reflective volume hologram; and a scattering reflecting member which is an opaque member, which has a function of, when light emitted from a light source is reflected thereat, scattering and emitting the reflected light, and which is disposed side by side with the reflective volume hologram on the side opposite to the light source with respect to the reflective volume hologram.

Advantageous Effects of Invention

According to the present invention, an authentication device and method for a security medium including a reflective volume hologram, capable of easily performing authentication determination and a security medium including the reflective volume hologram can be provided.

DETAILED DESCRIPTION OF THE INVENTION

Hereinafter, an authenticity determination device for a reflective volume hologram, an authenticity determination method therefor, and a security medium using a reflective volume hologram according to the present invention will be described with reference to the accompanying drawings.

Figure 1:
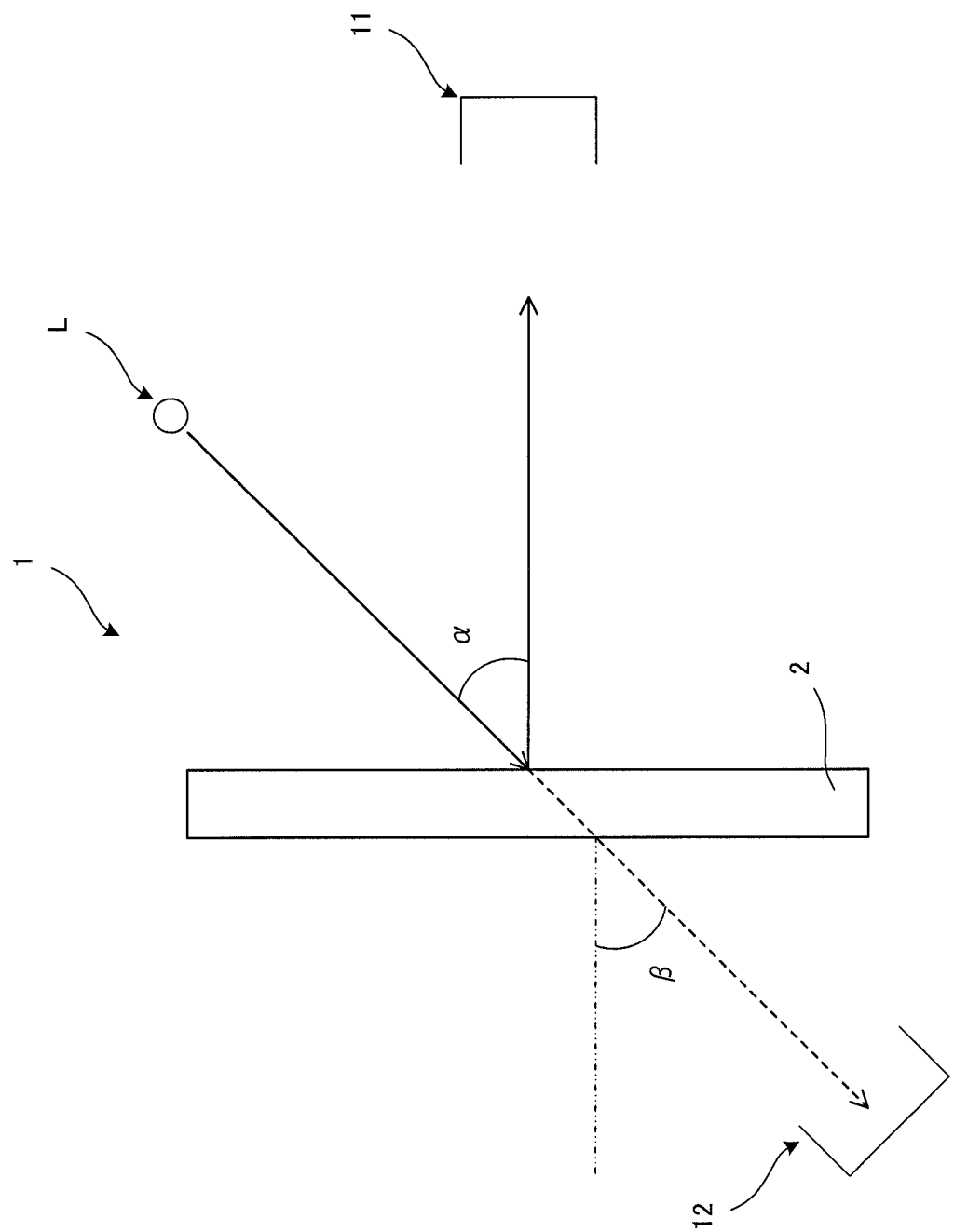
FIG. 1 illustrates an authenticity determination device for a reflective volume hologram according to a first embodiment.
Figure 2:
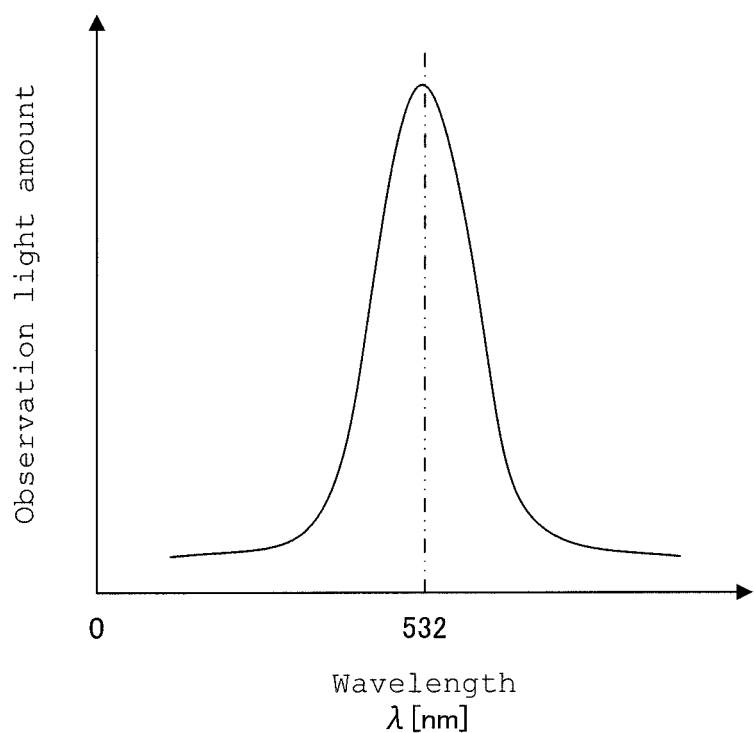
FIG. 2 illustrates the relationship between the wavelength of light observed at the location of a first observation device and an observation light amount in the authenticity determination device for the reflective volume hologram according to the first embodiment.
Figure 3:
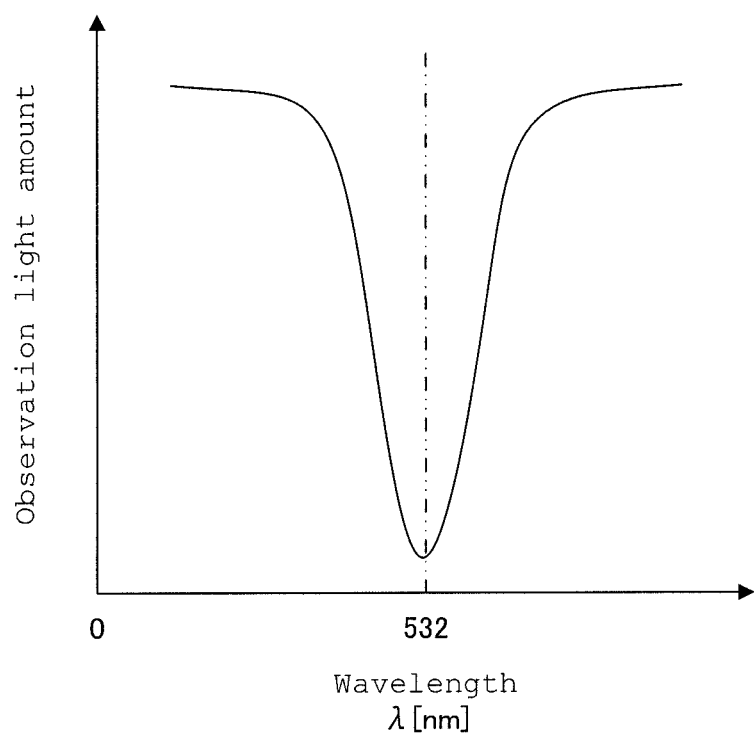
FIG. 3 illustrates the relationship between the wavelength of light observed at the location of a second observation device and an observation light amount in the authenticity determination device for the reflective volume hologram according to the first embodiment.

FIG. 1 illustrates an authenticity determination device 1 for a reflective volume hologram 2 according to a first embodiment. FIG. 2 illustrates the relationship between the wavelength of light observed at the location of a first observation device and an observation light amount in the authenticity determination device 1 for the reflective volume hologram 2 according to the first embodiment. FIG. 3 illustrates the relationship between the wavelength of light observed at the location of a second observation device and an observation light amount in the authenticity determination device 1 for the reflective volume hologram 2 according to the first embodiment. In the first embodiment, the reflective volume hologram 2 constitutes a security medium 10.

As illustrated in FIG. 1, the authenticity determination device 1 for the reflective volume hologram 2 according to the first embodiment includes, for example, a light source L, a first observation device 11, and a second observation device 12. The reflective volume hologram 2 to be subjected to the authenticity determination is transparent and produced by making object and reference lights with a predetermined wavelength incident on a hologram recording photosensitive material at a predetermined incident angle. For example, in the case of the reflective volume hologram 2 according to the first embodiment, an object light having a wavelength λ of 532 nm is made incident on the surface of the hologram recording photosensitive material from the direction perpendicular thereto, and a reference light having a wavelength λ of 532 nm is made incident from the back side of the hologram recording photosensitive material at an incident angle of 45° with respect thereto.

When light is made incident on the thus recorded reflective volume hologram 2 from the vicinity of an angle in the direction opposite to the direction of the reference light at the production time, the reflective volume hologram 2 strongly diffracts light having a wavelength in the vicinity of the recording wavelength λ(=532 nm) in the vicinity of the direction opposite to the incident direction of the object light. In this case, the incident direction of the light source in which the light amount of the diffracted light is maximum is referred to as "pre-designed incident direction" of the reflective volume hologram 2. The diffraction direction of the diffracted light in that case is referred to as "pre-designed diffraction direction" of the reflective volume hologram 2. The wavelength of the reflected diffracted light whose wavelength is limited to a narrow range by wavelength selectivity is referred to as "pre-designed diffraction wavelength" of the reflective volume hologram 2. The same definitions are applied in the following embodiments.

The light source L of the authenticity determination device 1 is a light source (e.g., white light source) that includes the pre-designed diffraction wavelength of the reflective volume hologram 2 and is disposed on the front surface side of the reflective volume hologram 2 so that a reproduction light to be irradiated is incident on the reflective volume hologram 2 from the pre-designed incident direction of the reflective volume hologram 2. The first observation device 11 is disposed in the pre-designed diffraction direction of the reflective volume hologram 2. The second observation device 12 is disposed at a position that receives light which is emitted from the light source L, goes straight, and is then transmitted through the reflective volume hologram 2.

For example, in the first embodiment, the light source L is disposed in the pre-designed direction of an incident angle α=45° on the front surface side of the reflective volume hologram 2. The first observation device 11 is disposed in a direction (pre-designed diffraction direction of the reflective volume hologram 2) substantially perpendicular to the surface of the reflective volume hologram 2, and the second observation device 12 is disposed on the back surface side of the reflective volume hologram 2 in the direction of an emission angle β=45° in which light emitted from the light source L and transmitting through the reflective volume hologram 2 travels.

The operation of the thus configured authenticity determination device 1 for the reflective volume hologram 2 according to the present embodiment will be described.

In the authenticity determination device 1 for the reflective volume hologram 2 according to the present embodiment, light including the pre-designed diffraction wavelength is emitted from the light source L to be incident on the reflective volume hologram 2. At this time, the relationship between the wavelength and light amount of light including the pre-designed diffraction wavelength of the reflective volume hologram 2 observed in the first observation device 11 and the relationship between the wavelength and light amount of light including the pre-designed diffraction wavelength of the reflective volume hologram 2 observed in the second observation device 12 are measured. When the reflective volume hologram 2 is genuine, the light amount observed in the first observation device 11 is large in the pre-designed diffraction wavelength of the reflective volume hologram 2 and small in other wavelengths because of absence of diffraction, and the light amount observed in the second observation device 12 is small in the pre-designed diffraction wavelength of the reflective volume hologram 2 and large in other wavelengths because the light is not diffracted but transmitted through the reflective volume hologram 2. When the reflective volume hologram 2 is counterfeit, the light amount observed in the first observation device 11 and that observed in the second observation device 12 differ from those when the reflective volume hologram 2 is genuine. The authenticity determination device 1 preferably has a determination section that determines the authenticity of the reflective volume hologram 2 on the basis of such results.

In the authenticity determination device 1 for the reflective volume hologram 2 according to the first embodiment, the light including the pre-designed diffraction wavelength of the reflective volume hologram 2 is incident at the pre-designed incident angle α (=45°) of the reflective volume hologram 2. As illustrated in FIG. 2, when the reflective volume hologram 2 is genuine, the light amount observed in the first observation device 11 is large in the pre-designed diffraction wavelength λ (=532 nm) of the reflective volume hologram 2 and small in other wavelengths. Further, as illustrated in FIG. 3, the light amount observed in the second observation device 12 is small in the pre-designed diffraction wavelength λ (=532 nm) of the reflective volume hologram 2 and large in other wavelengths.

The wavelength of 532 nm at the production in the first embodiment is a green wavelength, so that assuming that the first and second observation devices 11 and 12 are configured to observe colors, a green color is observed in the first observation device 11, and, when the light source is a white light source, a red-violet color which is the complementary color of the green color is observed in the second observation device 12.

As described above, the authenticity determination device 1 for a security medium 10 including the reflective volume hologram 2 according to the present embodiment includes the light source L disposed on the front surface side of the reflective volume hologram 2 so that light emitted therefrom is incident on the reflective volume hologram 2, the first observation device 11 disposed in the pre-designed diffraction direction of the reflective volume hologram 2, and the second observation device 12 disposed in a direction other than the pre-designed diffraction direction of the reflective volume hologram 2. In the thus configured authenticity determination device 1, the light including the pre-designed diffraction wavelength is emitted from the light source L to be incident on the reflective volume hologram 2. Then, when the light amount observed in the first observation device 11 is larger in the diffraction wavelength than in other wavelengths, and the light amount observed in the second observation device 12 is smaller in the diffraction wavelength than in other wavelengths (a complementary color is obtained by reducing the light of the diffraction wavelength from the light of the light source), it is determined that the reflective volume hologram 2 is genuine, thus allowing the authenticity of the reflective volume hologram 2 to be determined easily.

The following describes an authenticity determination method for the reflective volume hologram 2 when a ceiling fluorescent lamp can be used as the light source L.

Figure 4:
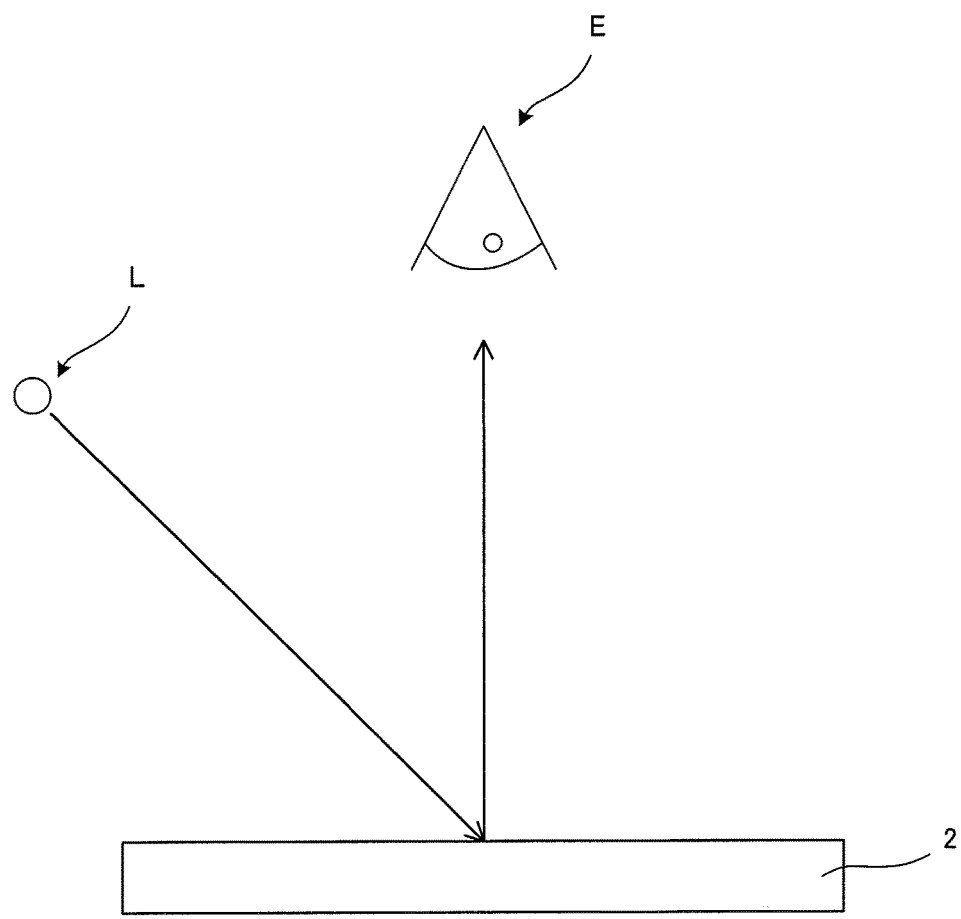
FIG. 4 illustrates an example of an authenticity determination method for the reflective volume hologram according to the first embodiment.
Figure 5:
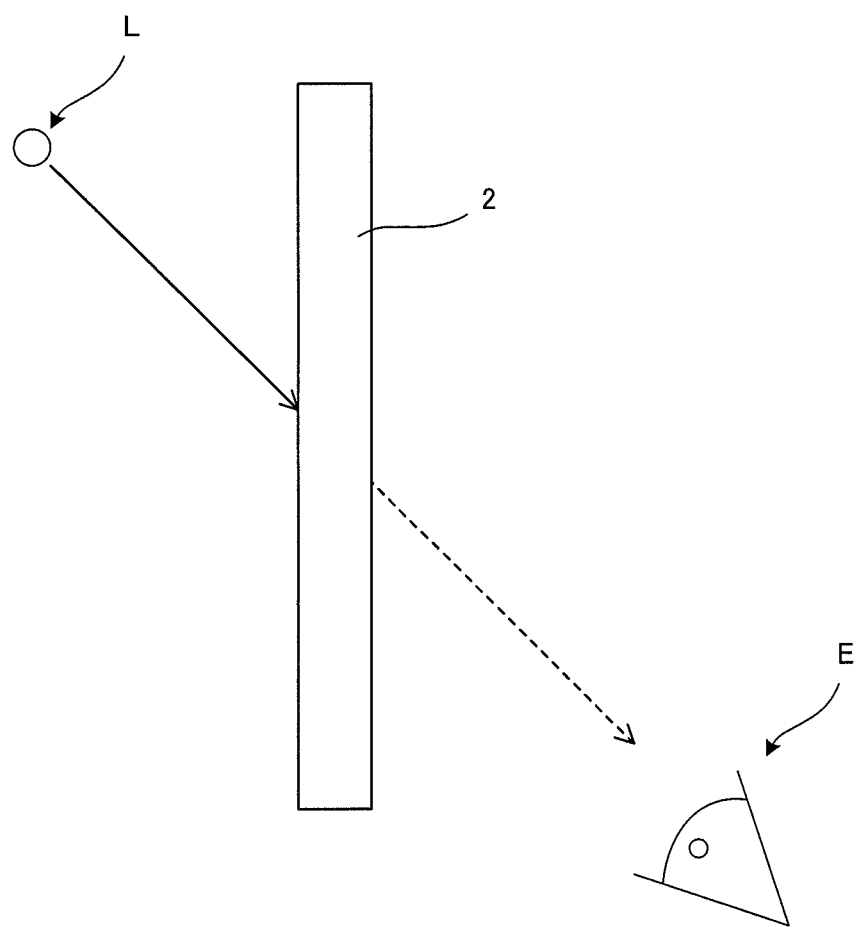
FIG. 5 illustrates an example of an authenticity determination method for the reflective volume hologram according to the first embodiment.

FIGS. 4 and 5 each illustrate an example of an authenticity determination method for the reflective volume hologram according to the first embodiment.

The authenticity of the reflective volume hologram 2 according to the first embodiment can be determined by naked eyes. The reflective volume hologram 2 to be subjected to the authenticity determination is produced by making object and reference lights with a predetermined wavelength incident on a hologram recording photosensitive material at a predetermined incident angle. The object and reference lights are assumed to have a predetermined wavelength (for example, in the present embodiment, a wavelength of 532 nm which is a green color).

As illustrated in FIG. 4, the reflective volume hologram 2 is moved so as to make light (e.g., white light) including the pre-designed diffraction wavelength of the reflective volume hologram 2 which is emitted from the light source L incident on the reflective volume hologram 2 from the pre-designed incident direction so that the incident light is the reproduction illumination light of the reflective volume hologram 2. Then, when light is viewed by observer's eyes E from the pre-designed diffraction direction of the reflective volume hologram 2, an object image looks green which is the color of the pre-designed diffracted light of the reflective volume hologram 2.

On the other hand, as illustrated in FIG. 5, the reflective volume hologram 2 is moved so as to make light (e.g., white light) including the pre-designed diffraction wavelength of the reflective volume hologram 2 which is emitted from the light source L transmit the reflective volume hologram 2. Then, when light is viewed by observer's eyes E from the direction in which a straight-advance transmitted light from the light source L is observed through the reflective volume hologram 2, an object image looks a red-violet color (when the light source is a white light source) in which green color is lost. That is, the complementary color of the pre-designed diffracted light of the reflective volume hologram 2 is observed.

As described above, the authenticity determination method for the security medium 10 including the reflective volume hologram 2 according to the first embodiment includes a first step of moving the reflective volume hologram 2 so that the light including the pre-designed diffraction wavelength of the reflective volume hologram 2 which is emitted from the light source L and incident on the reflective volume hologram 2 is the reproduction illumination light of the reflective volume hologram 2 and observing the light from the pre-designed diffraction direction of the reflective volume hologram 2, and a second step of moving the reflective volume hologram 2 so that the light including the pre-designed diffraction wavelength of the reflective volume hologram 2 which is emitted from the light source L and incident on the reflective volume hologram 2 is transmitted through the reflective volume hologram 2 and observing the light from the side opposite to the light source L with respect to the reflective volume hologram 2. When it is determined in the first step that the light amount in the diffraction wavelength is larger than that in other wavelengths and in the second step that the light amount in the diffraction wavelength is smaller than that in other wavelengths, the reflective volume hologram 2 is determined to be genuine, thus allowing the authenticity of the reflective volume hologram 2 to be determined easily.

Next, an authenticity determination device for a reflective volume hologram according to a second embodiment will be described.

Figure 6:
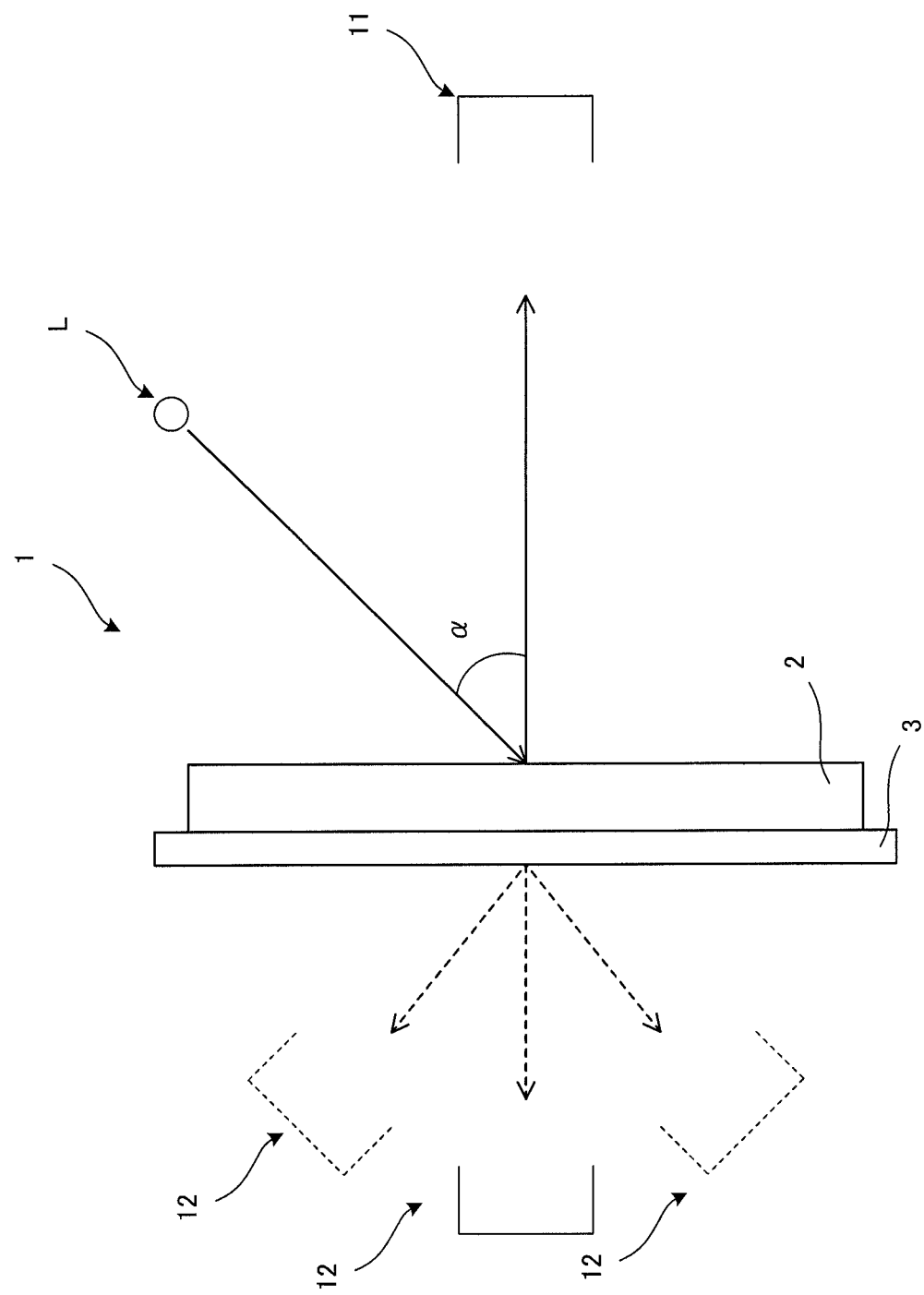
FIG. 6 illustrates an authenticity determination device for a reflective volume hologram according to the second embodiment.

FIG. 6 illustrates an authenticity determination device for a reflective volume hologram according to the second embodiment.

As illustrated in FIG. 6, the authenticity determination device 1 for the reflective volume hologram 2 according to the second embodiment includes, for example, the light source L, first observation device 11, second observation device 12, and a scattering transmitting member 3. The reflective volume hologram 2 to be subjected to the authenticity determination is transparent and produced by making object and reference lights with a predetermined wavelength incident on a hologram recording photosensitive material at a predetermined incident angle. For example, in the case of the genuine reflective volume hologram 2, an object light having a wavelength $\lambda$ of 532 nm is made incident on the surface of the hologram recording photosensitive material from the direction perpendicular thereto, and a reference light having a wavelength $\lambda$ of 532 nm is made incident from the back side of the hologram recording photosensitive material at an incident angle of 45° with respect thereto.

The light source L of the authenticity determination device 1 is a light source (e.g., white light source) that includes the pre-designed diffraction wavelength of the reflective volume hologram 2 and is disposed on the front surface side of the reflective volume hologram 2 so that a reproduction light to be irradiated is incident on the reflective volume hologram 2 from the pre-designed incident direction of the reflective volume hologram 2. The first observation device 11 is disposed in the pre-designed diffraction direction of the reflective volume hologram 2. The second observation device 12 is disposed on the side opposite to the light source L with respect to the reflective volume hologram 2 and scattering transmitting member 3. The scattering transmitting member 3 is a transparent member and has a function of, when a white light emitted from the light source L is transmitted therethrough, scattering and emitting the transmitted light. The scattering transmitting member 3 is disposed side by side with the reflective volume hologram 2 on the side opposite to the light source L with respect to the reflective volume hologram 2.

In the second embodiment, the light source L is disposed in the direction of an incident angle $\alpha=45°$ on the front surface side of the reflective volume hologram 2. The first observation device 11 is disposed in the direction perpendicular to the surface of the reflective volume hologram 2. The second observation device 12 may be disposed at any position on the back surface side of the reflective volume hologram 2 since the light that has emitted from the light source and transmitted through the reflective volume hologram 2 is scattered by the scattering transmitting member 3.

The operation of the thus configured authenticity determination device 1 for the reflective volume hologram 2 according to the second embodiment will be described.

In the authenticity determination device 1 for the reflective volume hologram 2 according to the present embodiment, light including the pre-designed diffraction wavelength is emitted from the light source L to be incident on the reflective volume hologram 2. At this time, the relationship between the wavelength and light amount of light including the pre-designed diffraction wavelength of the reflective volume hologram 2 observed in the first observation device 11 and the relationship between the wavelength and light amount of light including the pre-designed diffraction wavelength of the reflective volume hologram 2 observed in the second observation device 12 are measured. When the reflective volume hologram 2 is genuine, the light amount observed in the first observation device 11 is large in the pre-designed diffraction wavelength of the reflective volume hologram 2 and small in other wavelengths because of absence of diffraction, and the light amount observed in the second observation device 12 is small in the pre-designed diffraction wavelength of the reflective volume hologram 2 and large in other wavelengths because the light is not diffracted but transmitted through the reflective volume hologram 2. When the reflective volume hologram 2 is counterfeit, the light amount observed in the first observation device 11 and that observed in the second observation device 12 differ from those when the reflective volume hologram 2 is genuine. The authenticity determination device 1 preferably has a determination section that determines the authenticity of the reflective volume hologram 2 on the basis of such results.

In the authenticity determination device 1 for the reflective volume hologram 2 according to the second embodiment, the light including the pre-designed diffraction wavelength of the reflective volume hologram 2 is incident at the pre-designed incident angle $\alpha$ ($=45°$) of the reflective volume hologram 2. As illustrated in FIG. 2, when the reflective volume hologram 2 is genuine, the light amount observed in the first observation device 11 is large in the pre-designed diffraction wavelength $\lambda$ ($=532$ nm) of the reflective volume hologram 2 and small in other wavelengths. Further, as illustrated in FIG. 3, the light amount observed in the second observation device 12 is small in the pre-designed diffraction wavelength λ (=532 nm) of the reflective volume hologram 2 and large in other wavelengths.

The wavelength of 532 nm at the production in the second embodiment is a green wavelength, so that assuming that the first and second observation devices 11 and 12 are configured to observe colors, a green color is observed in the first observation device 11, and, when the light source is a white light source, a red-violet color which is the complementary color of the green color is observed in the second observation device 12.

As described above, in the authenticity determination device 1 for the security medium 10 including the reflective volume hologram 2 according to the second embodiment, by measuring the wavelength observed in the first observation device 11 and the wavelength observed in the second observation device 12, the authenticity of the reflective volume hologram 2 can be determined easily. Further, in the authenticity determination device 1 for the security medium 10 including the reflective volume hologram 2 according to the second embodiment, the security medium 10 includes the scattering transmitting member 3 which is a transparent member, which has a function of, when light emitted from the light source L is transmitted therethrough, scattering and emitting the transmitted light, and which is disposed side by side with the reflective volume hologram 2, so that the second observation device 12 may be disposed at any position on the back surface side of the reflective volume hologram 2, thus allowing the wavelength to be easily observed by the second observation device 12.

Further, the scattering transmitting member 3 may be installed in the authenticity determination device 1 or may be laminated on the reflective volume hologram 2. The laminate of the reflective volume hologram 2 and scattering transmitting member 3 can be used as the security medium 10. The following describes an authenticity determination method when the reflective volume hologram 2 and scattering transmitting member 3 are laminated to constitute the security medium 10.

Figure 7:
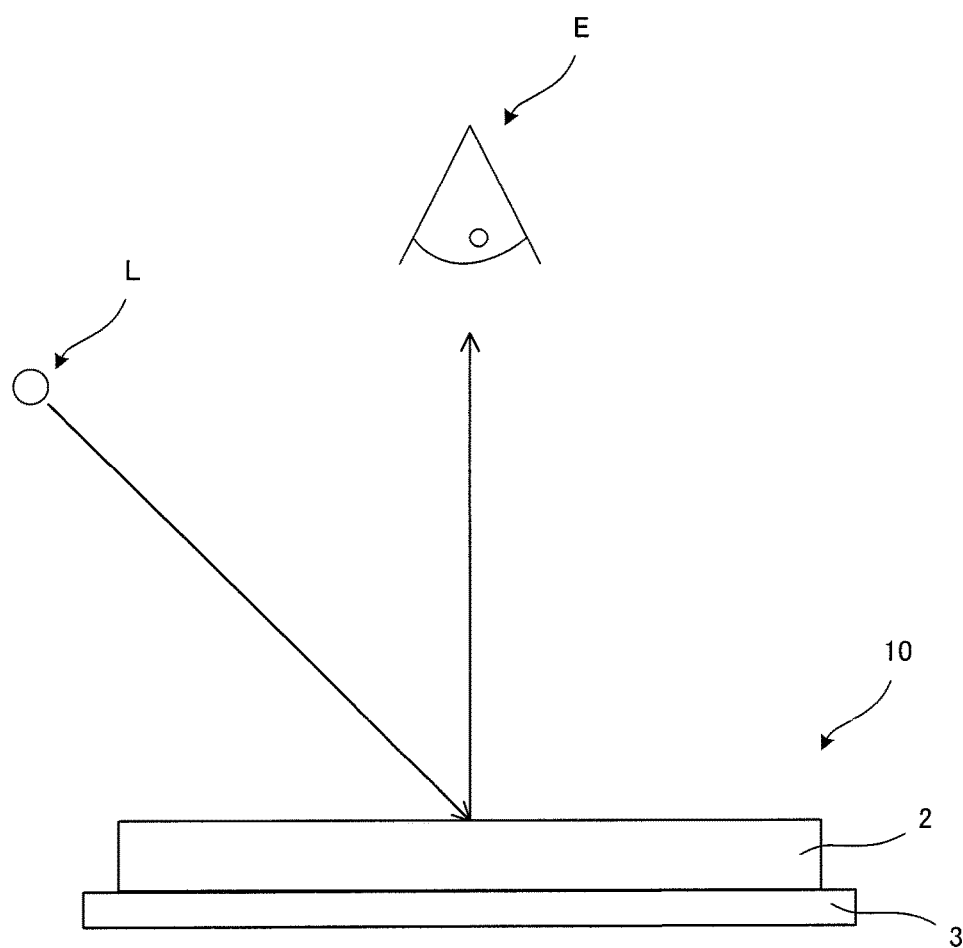
FIG. 7 illustrates an example of an authenticity determination method for the reflective volume hologram according to the second embodiment.
Figure 8:
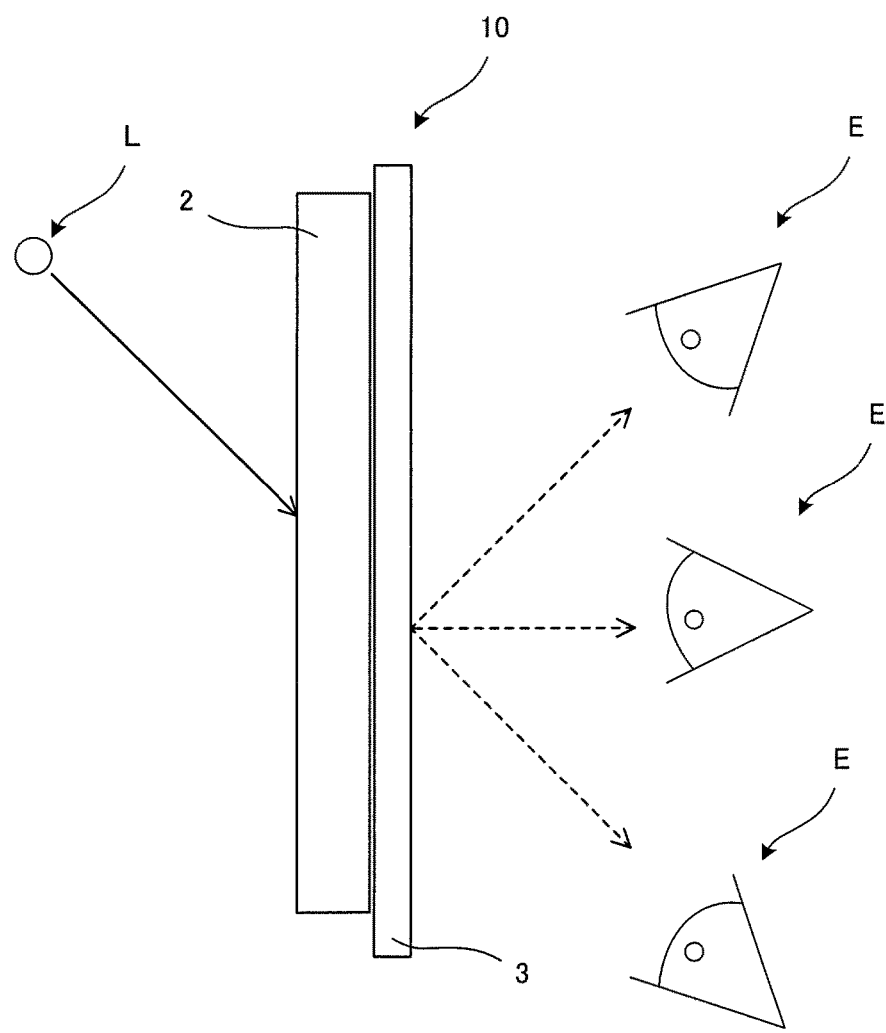
FIG. 8 illustrates an example of an authenticity determination method for the reflective volume hologram according to the second embodiment.

FIGS. 7 and 8 each illustrate an example of an authenticity determination method for the reflective volume hologram according to the second embodiment.

The authenticity of the security medium 10 according to the present embodiment can be determined by naked eyes. The reflective volume hologram 2 constituting the security medium to be subjected to the authenticity determination is produced by making object and reference lights with a predetermined wavelength incident on a hologram recording photosensitive material at a predetermined incident angle. The object and reference lights are assumed to have a predetermined wavelength (for example, in the present embodiment, a wave length of 532 nm which is a green color).

As illustrated in FIG. 7, the security medium 10 is moved so as to make light (e.g., white light) including the pre-designed diffraction wavelength of the reflective volume hologram 2 which is emitted from the light source L incident on the reflective volume hologram 2 from the pre-designed incident direction so that the incident light is the reproduction illumination light of the reflective volume hologram 2. Then, when light is viewed by observer's eyes E from the pre-designed diffraction direction of the reflective volume hologram 2, an object image looks green which is the color of the pre-designed diffracted light of the reflective volume hologram 2.

On the other hand, as illustrated in FIG. 8, the security medium 10 is moved so as to make light (e.g., white light) including the pre-designed diffraction wavelength of the reflective volume hologram 2 which is emitted from the light source L transmit the security medium 10. Then, when light is viewed by observer's eyes E from the direction in which a straight-advance transmitted light from the light source L is observed through the security medium 10, an object image looks red-violet (when the light source is a white light source) in which green color is lost. That is, the complementary color of the pre-designed diffracted light of the reflective volume hologram 2 is observed. The light emitted from the light source L and transmitting through the reflective volume hologram 2 is scattered by the scattering transmitting member 3, so that the observer can see the complementary color of the object and reference lights with his or her eyes E put at any position on the side opposite to the light source L with respect to the security medium 10.

As described above, in the authenticity determination method for the security medium 10 including the reflective volume hologram 2 according to the second embodiment, the security medium 10 includes the scattering transmitting member 3 which is a transparent member, which has a function of, when the light including the pre-designed diffraction wavelength of the reflective volume hologram 2 emitted from the light source L is transmitted therethrough, scattering and emitting the transmitted light, and which is disposed side by side with the reflective volume hologram 2, and the method includes a first step of moving the reflective volume hologram 2 so that the light including the pre-designed diffraction wavelength of the reflective volume hologram 2 which is emitted from the light source L and incident on the reflective volume hologram 2 is the reproduction illumination light of the reflective volume hologram 2 and observing the light from the pre-designed diffraction direction of the reflective volume hologram 2 and a second step of moving the reflective volume hologram 2 so that the light including the pre-designed diffraction wavelength of the reflective volume hologram 2 which is emitted from the light source L and incident on the reflective volume hologram 2 is transmitted through the reflective volume hologram 2 and observing the light from the side opposite to the light source L with respect to the reflective volume hologram 2. When it is determined in the first step that the light amount in the diffraction wavelength is larger than that in other wavelengths and it is determined in the second step that the light amount in the diffraction wavelength is smaller than that in other wavelengths, the reflective volume hologram 2 is determined to be genuine, thus allowing the authenticity of the reflective volume hologram 2 to be determined easily. Further, in the authenticity determination method for the security medium 10 according to the second embodiment, the light including the pre-designed diffraction wavelength of the reflective volume hologram 2 which is emitted from the light source L is incident on the security medium 10 from a predetermined angle for reflection and transmission, and the observer compares observed colors, thus allowing the authenticity of the security medium 10 to be determined easily. Further, in the present embodiment, the security medium 10 includes the scattering transmitting member 3, so that the observer may set his or her eyes E at any position on the back side of the security medium 10, thus facilitating observation.

Next, an authenticity determination device for a reflective volume hologram according to a third embodiment will be described.

Figure 9:
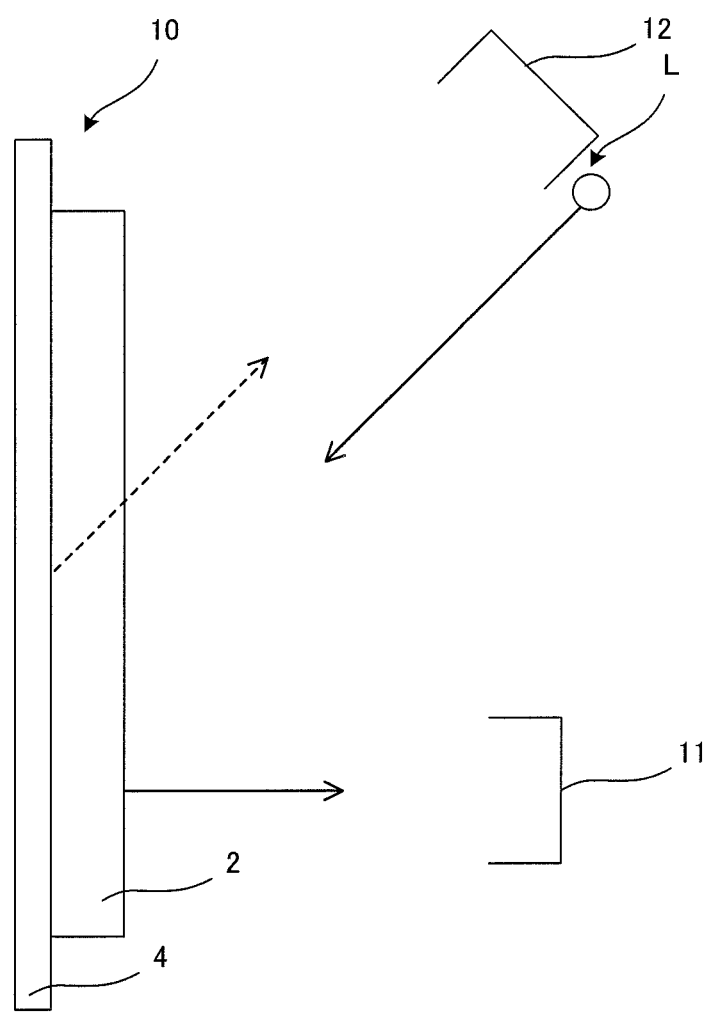
FIG. 9 illustrates an authenticity determination device for a reflective volume hologram according to a third embodiment.
Figure 10:
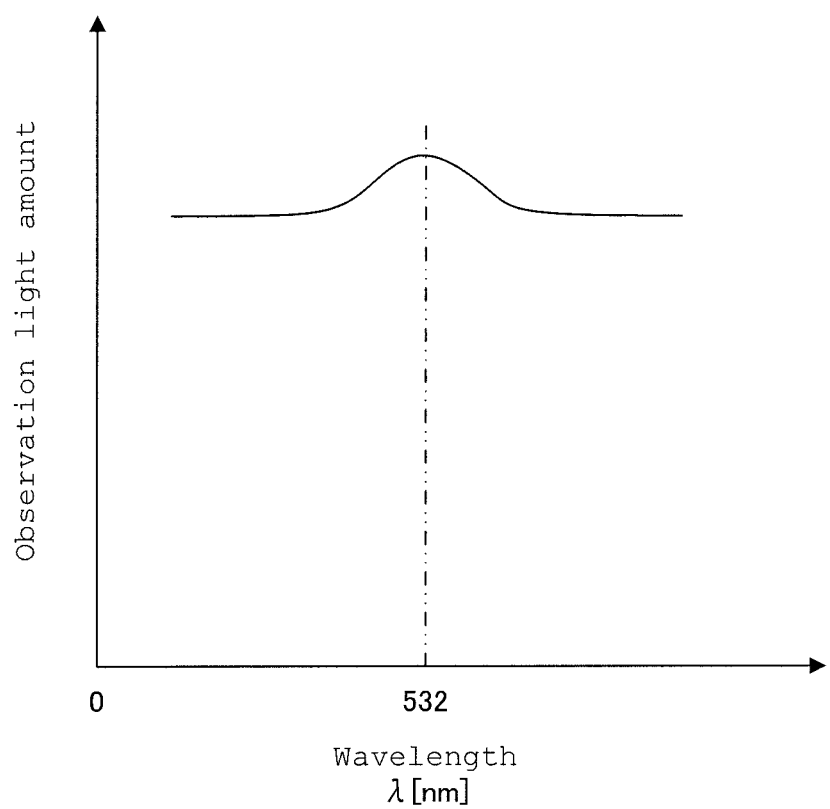
FIG. 10 illustrates the relationship between the wavelength of a light source observed at the location of the first observation device and an observation light amount in the authenticity determination device for the reflective volume hologram according to the third embodiment.
Figure 11:
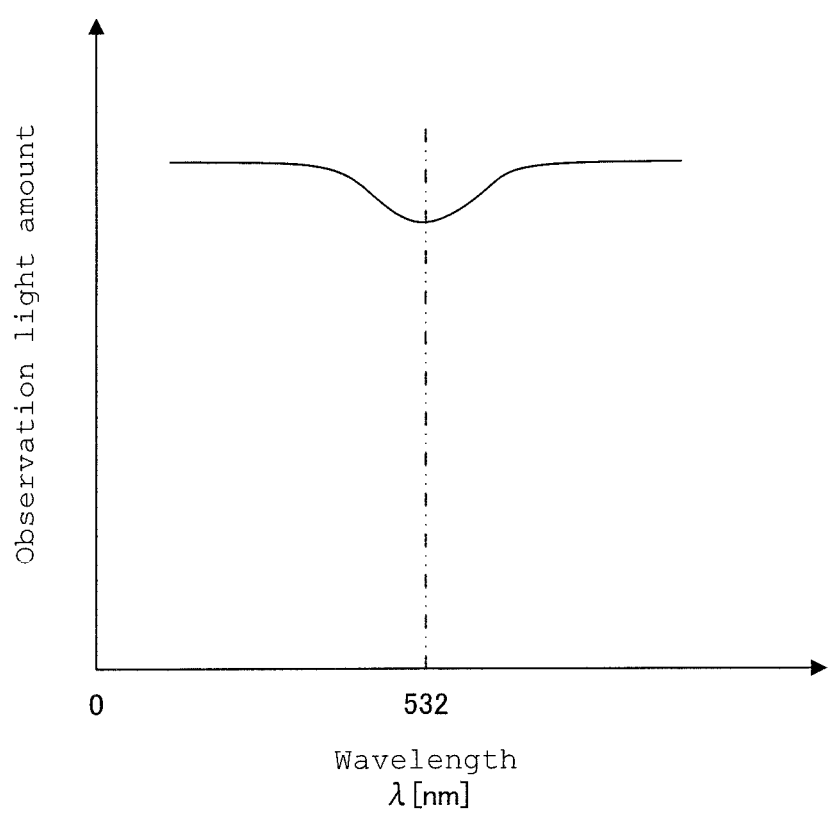
FIG. 11 illustrates the relationship between the wavelength of a light source observed at the location of the second observation device and an observation light amount in the authenticity determination device for the reflective volume hologram according to the third embodiment.

FIG. 9 illustrates an authenticity determination device for a reflective volume hologram according to the third embodiment. FIG. 10 illustrates the relationship between the wavelength of light observed at the location of the first observation device and an observation light amount in the authenticity determination device 1 for the reflective volume hologram 2 according to the third embodiment. FIG. 11 illustrates the relationship between the wavelength of light observed at the location of the second observation device and an observation light amount in the authenticity determination device 1 for the reflective volume hologram 2 according to the third embodiment.

As illustrate din FIG. 9, the authenticity determination device 1 for the reflective volume hologram 2 according to the third embodiment includes, for example, the light source L, first observation device 11, second observation device 12, and a scattering reflecting member 4. The reflective volume hologram 2 to be subjected to the authenticity determination is transparent and produced by making object and reference lights with a predetermined wavelength incident on a hologram recording photosensitive material at a predetermined incident angle. For example, in the case of the genuine reflective volume hologram 2, an object light having a wavelength $\lambda$ of 532 nm is made incident on the surface of the hologram recording photosensitive material from the direction perpendicular thereto, and a reference light having a wavelength $\lambda$ of 532 nm is made incident from the back side of the hologram recording photosensitive material at an incident angle of 45° with respect thereto.

The light source L of the authenticity determination device 1 is a light source (e.g., white light source) that includes the pre-designed diffraction wavelength of the reflective volume hologram 2 and is disposed on the front surface side of the reflective volume hologram 2 so that a reproduction light to be irradiated is incident on the reflective volume hologram 2 from the pre-designed incident direction of the reflective volume hologram 2. The first observation device 11 is disposed in the pre-designed diffraction direction of the reflective volume hologram 2. The second observation device 12 is disposed in the pre-designed incident direction of the reflective volume hologram 2. The scattering reflecting member 4 is an opaque member and has a function of, when the light including the pre-designed diffraction wavelength of the reflective volume hologram 2 emitted from the light source L is reflected thereat, scattering and emitting the reflected light. The scattering reflecting member 4 is disposed side by side with the reflective volume hologram 2 on the side opposite to the light source L with respect to the reflective volume hologram 2. While the light source L and the second observation device 12 are disposed in the same direction, they may be slightly shifted in position from each other. Alternatively, the positions of the light source L and second observation device 12 may be replaced after light is emitted from the light source L so as to allow the second observation device 12 to perform observation.

In the third embodiment, for example, the light source L is disposed in the pre-designed direction of an incident angle $\alpha$=45° on the front surface side of the reflective volume hologram 2. The first observation device 11 is disposed in a direction (pre-designed diffraction direction of the reflective volume hologram 2) perpendicular to the surface of the reflective volume hologram 2. The second observation device 12 may be disposed in the direction of an incident angle $\alpha$=45° on the front surface side of the reflective volume hologram 2.

The operation of the thus configured authenticity determination device 1 for the reflective volume hologram 2 according to the third embodiment will be described.

In the authenticity determination device 1 for the reflective volume hologram 2 according to the present embodiment, light including the pre-designed diffraction wavelength is emitted from the light source L to be incident on the reflective volume hologram 2. At this time, the relationship between the wavelength and light amount of light including the pre-designed diffraction wavelength of the reflective volume hologram 2 observed in the first observation device 11 and the relationship between the wavelength and light amount of light including the pre-designed diffraction wavelength of the reflective volume hologram 2 observed in the second observation device 12 are measured. When the reflective volume hologram 2 is genuine, the light amount observed in the first observation device 11 is large in the pre-designed diffraction wavelength of the reflective volume hologram 2 and small in other wavelengths because of absence of diffraction, and the light amount observed in the second observation device 12 is small in the pre-designed diffraction wavelength of the reflective volume hologram 2 and large in other wavelengths because the light is not diffracted but transmitted through the reflective volume hologram 2. When the reflective volume hologram 2 is counterfeit, the light amount observed in the first observation device 11 and that observed in the second observation device 12 differ from those when the reflective volume hologram 2 is genuine. The authenticity determination device 1 preferably has a determination section that determines the authenticity of the reflective volume hologram 2 based on such results.

In the authenticity determination device 1 for the reflective volume hologram 2 according to the third embodiment, the light including the pre-designed diffraction wavelength of the reflective volume hologram 2 is incident at the pre-designed incident angle $\alpha$ (=45°) of the reflective volume hologram 2. As illustrated in FIG. 10, when the reflective volume hologram 2 is genuine, the light amount observed in the first observation device 11 is large in the pre-designed diffraction wavelength $\lambda$ (=532 nm) of the reflective volume hologram 2 and small in other wavelengths. Further, as illustrated in FIG. 11, the light amount observed in the second observation device 12 is small in the pre-designed diffraction wavelength $\lambda$ (=532 nm) of the reflective volume hologram 2 and large in other wavelengths.

The wavelength of 532 nm at the production in the third embodiment is a green wavelength, so that assuming that the first and second observation devices 11 and 12 are configured to observe colors, a green color is observed in the first observation device 11, and, when the light source is a white light source, a red-violet color which is the complementary color of the green color is observed in the second observation device 12.

Figure 12:
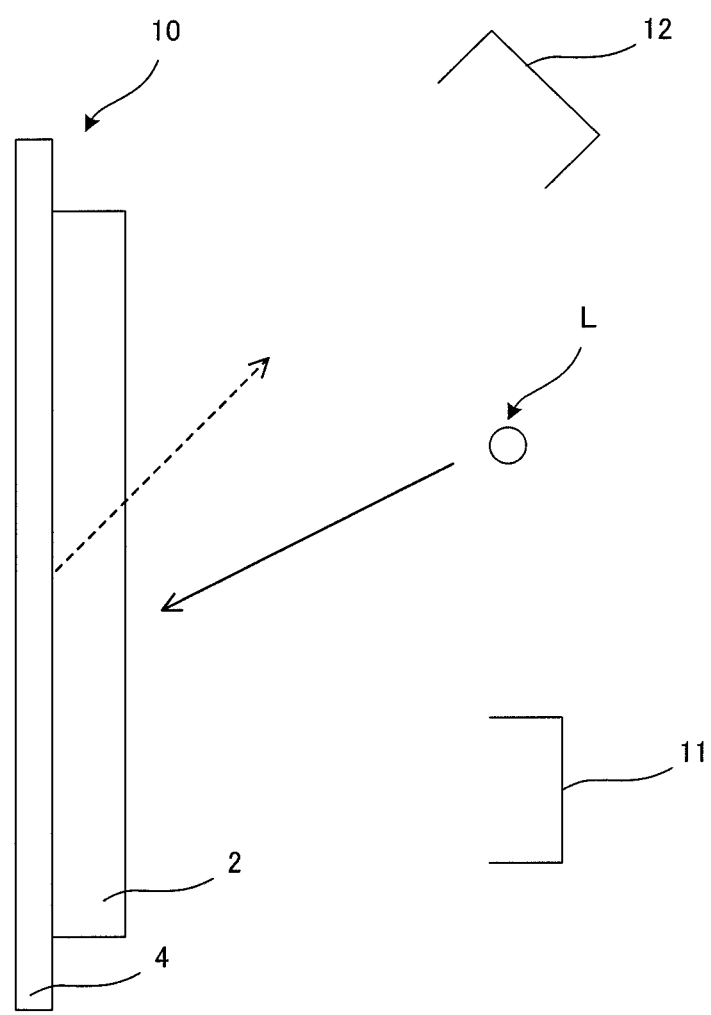
FIG. 12 illustrates another example of the authenticity determination device for the reflective volume hologram according to the third embodiment.

FIG. 12 illustrates another example of the authenticity determination device for the reflective volume hologram according to the third embodiment.

As another example, in the authenticity determination device 1 for the reflective volume hologram 2 according to the third embodiment, at observation using the second observation device 12, the light source L may be disposed so that light is incident on the reflective volume hologram 2 from a direction other than that of the first observation device 11, i.e., may be disposed in a direction other than the pre-designed diffraction direction of the reflective volume hologram 2. Even in this arrangement, a red-violet color which is the complementary color of a green color can be observed in the second observation device 12.

As described above, in the authenticity determination device 1 for the security medium 10 including the reflective volume hologram 2 according to the third embodiment, the security medium 10 includes the scattering reflecting member 4 which is an opaque member, which has a function of, when the light including the pre-designed diffraction wavelength of the reflective volume hologram 2 emitted from the light source L is reflected thereat, scattering and emitting the reflected light, and which is disposed side by side with the reflective volume hologram 2, thus allowing the wavelength to be observed easily by the second observation device 12. Further, in the third embodiment, the use of the scattering reflecting member 4 allows both the first and second observation devices 11 and 12 to be disposed on one side of the reflective volume hologram 2, so that the entire size of the authenticity determination device 1 can be reduced.

Further, the scattering reflecting member 4 may be installed in the authenticity determination device 1 or may be laminated on the reflective volume hologram 2. The laminate of the reflective volume hologram 2 and scattering reflecting member 4 can be used as the security medium 10. The following describes an authenticity determination method when the reflective volume hologram 2 and scattering reflecting member 4 are laminated to constitute the security medium 10.

Figure 13:
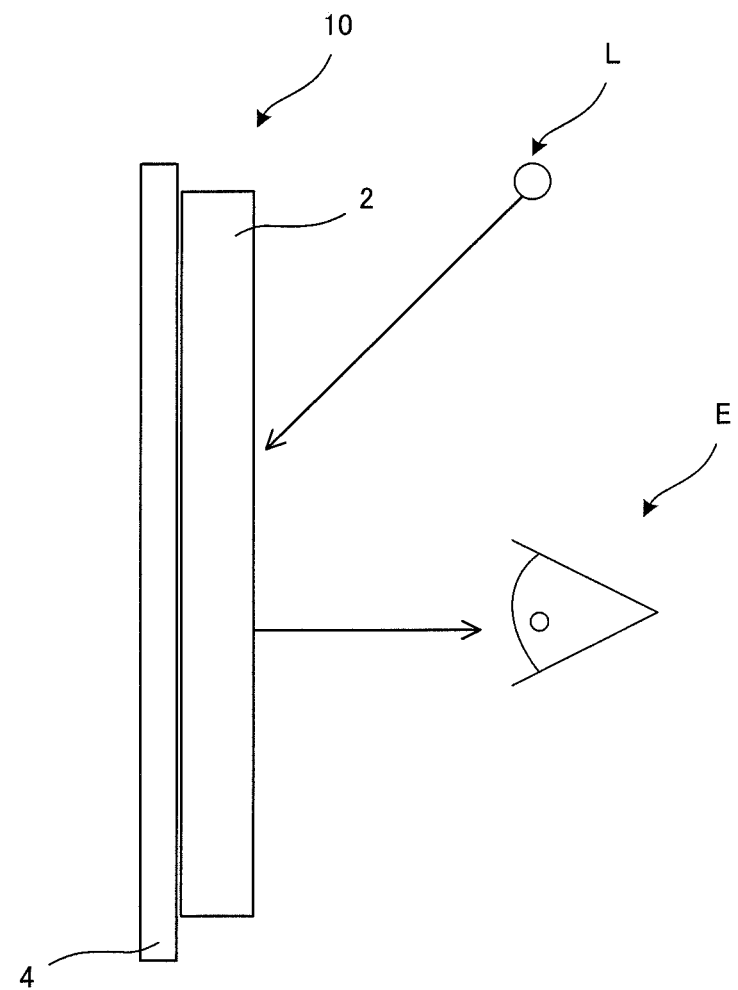
FIG. 13 illustrates an example of an authenticity determination method for the reflective volume hologram according to the third embodiment.
Figure 14:
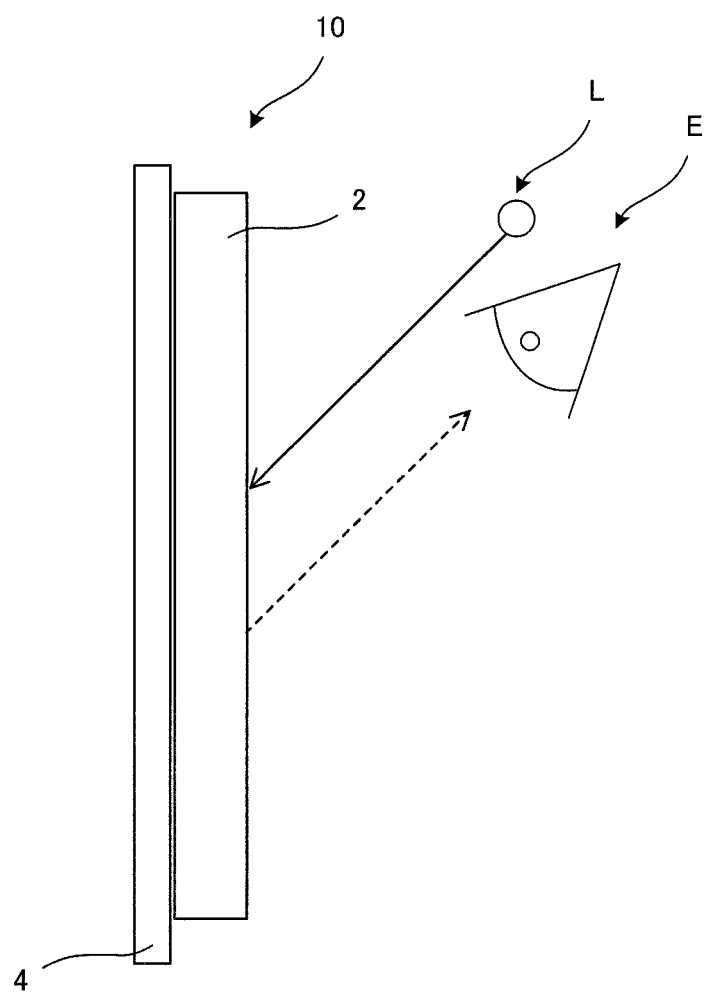
FIG. 14 illustrates an example of an authenticity determination method for the reflective volume hologram according to the third embodiment.

FIGS. 13 and 14 each illustrate an example of an authenticity determination method for the reflective volume hologram according to the third embodiment.

The authenticity of the security medium 10 according to the present embodiment can be determined by naked eyes. The reflective volume hologram 2 constituting the security medium 10 to be subjected to the authenticity determination is produced by making object and reference lights with a predetermined wavelength incident on a hologram recording photosensitive material at a predetermined incident angle. The object and reference lights are assumed to have a predetermined wavelength (for example, in the present embodiment, a wavelength of 532 nm which is a green color).

As illustrated in FIG. 13, when the eyes E are moved to view, from the light source L side of the security medium 10, light (e.g., a white light) including the pre-designed diffraction wavelength of the reflective volume hologram 2 which is emitted from the light source L in the pre-designed incident direction of the reflective volume hologram 2, an object image looks green which is the color of the pre-designed diffracted light in the pre-designed diffraction direction of the reflective volume hologram 2.

On the other hand, as illustrated in FIG. 14, when the eyes E are moved to view, from the pre-designed incident direction of the reflective volume hologram 2, the light including the pre-designed diffraction wavelength of the reflective volume hologram 2 which is emitted from the light source L in the pre-designed incident direction of the reflective volume hologram 2, an object image looks red-violet (when the light source is a white light source) in which green color is lost. That is, the complementary color of the pre-designed diffracted light of the reflective volume hologram 2 is observed.

As described above, in the authenticity determination method for the security medium 10 including the reflective volume hologram 2 according to the third embodiment, the security medium 10 includes the scattering reflecting member 4 which is an opaque member, which has a function of, when the light including the pre-designed diffraction wavelength of the reflective volume hologram 2 emitted from the light source L is reflected thereat, scattering and emitting the reflected light, and which is disposed side by side with the reflective volume hologram 2, and the method includes a first step of observing, from the pre-designed diffraction direction of the reflective volume hologram 2, the light including the pre-designed diffraction wavelength of the reflective volume hologram 2 which is emitted from the light source L in the pre-designed incident direction of the reflective volume hologram 2 and a second step of observing, from the pre-designed incident direction of the reflective volume hologram 2, the light including the pre-designed diffraction wavelength of the reflective volume hologram 2 which is emitted from the light source L in the pre-designed incident direction of the reflective volume hologram 2. When it is determined in the first step that the light amount in the diffraction wavelength is larger than that in other wavelengths and it is determined in the second step that the light amount in the diffraction wavelength is smaller than that in other wavelengths, the reflective volume hologram 2 is determined to be genuine, thus allowing the authenticity of the reflective volume hologram 2 to be determined easily. Further, in the authenticity determination method for the security medium 10 according to the third embodiment, the light including the pre-designed diffraction wavelength of the reflective volume hologram 2 which is emitted from the light source L is incident on the security medium 10 from a predetermined angle for reflection, and the observer compares observed colors, thus allowing the authenticity of the security medium 10 to be determined easily. Further, in the third embodiment, the security medium 10 includes the scattering reflecting member 4, so that the observer may put his or her eyes E at a position on one side of the security medium 10, thus facilitating observation.

Figure 15:
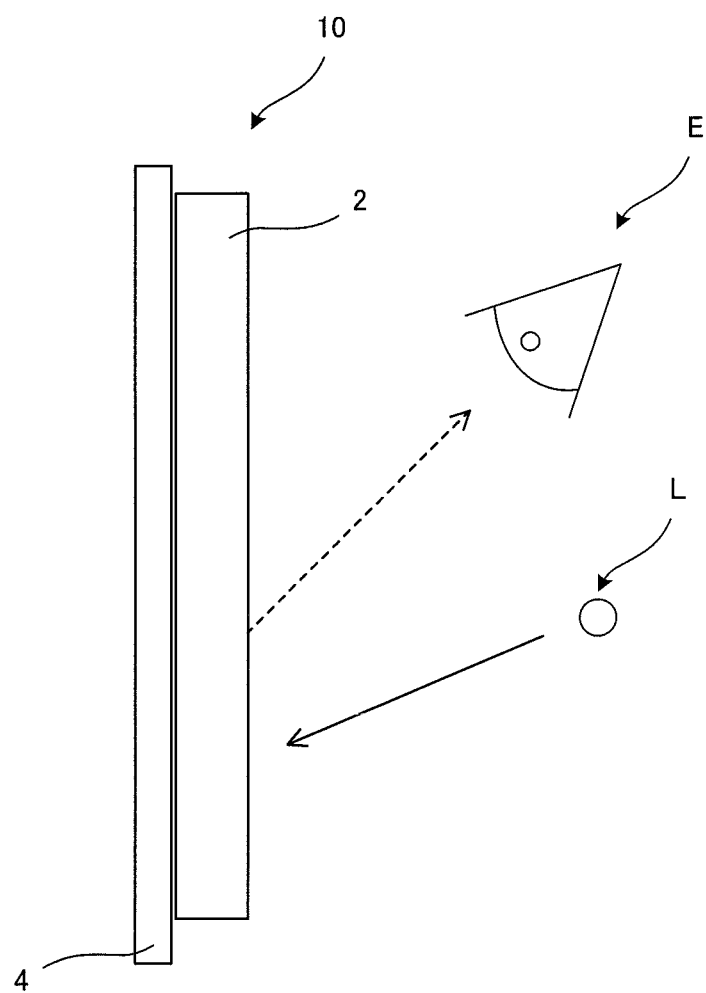
FIG. 15 illustrates another example of the authenticity determination method for the reflective volume hologram according to the third embodiment.

FIG. 15 illustrates another example of the authenticity determination method for the reflective volume hologram according to the third embodiment.

As illustrated in FIG. 15, in another example of the third embodiment, when the eyes E are moved to view, from the pre-designed incident direction of the reflective volume hologram 2, the light emitted from the light source L disposed in a direction other than the pre-designed diffraction direction of the reflective volume hologram 2, an object image looks red-violet (when the light source is a white light source) in which green color is lost. That is, the complementary color of the pre-designed diffracted light of the reflective volume hologram 2 is observed.

As described above, the authenticity determination device 1 for the security medium 10 including the reflective volume hologram 2 according to the present embodiment includes the light source L disposed on the front surface side of the reflective volume hologram 2 so that light emitted therefrom is incident on the reflective volume hologram 2, the first observation device 11 disposed in the pre-designed diffraction direction of the reflective volume hologram 2, and the second observation device 12 disposed in a direction other than the pre-designed diffraction direction of the reflective volume hologram 2. In the thus configured authenticity determination device 1, the light including the pre-designed diffraction wavelength is emitted from the light source L to be incident on the reflective volume hologram 2. Then, when the light amount observed in the first observation device 11 is larger in the diffraction wavelength than in other wavelengths, and the light amount observed in the second observation device 12 is smaller in the diffraction wavelength than in other wavelengths, it is determined that the reflective volume hologram 2 is genuine, thus allowing the authenticity of the reflective volume hologram 2 to be determined easily.

Further, in the authenticity determination device 1 for the security medium 10 including the reflective volume hologram 2 according to the present embodiment, the light source L is disposed so that light is incident on the reflective volume hologram 2 from the pre-designed incident direction of the reproduction illumination light of the reflective volume hologram 2, allowing the wavelength to be clearly observed by the first observation device 11.

Further, in the authenticity determination device 1 for the security medium 10 including the reflective volume hologram 2 according to the present embodiment, the second observation device 12 is disposed in the direction in which light emitted from the light source L goes straight and is then transmitted through the reflective volume hologram 2, allowing the wavelength to be clearly observed by the second observation device 12.

Further, in the authenticity determination device 1 for the security medium 10 including the reflective volume hologram 2 according to the present embodiment, the security medium 10 includes the scattering transmitting member 3 which is a transparent member, which has a function of, when light emitted from the light source L is transmitted therethrough, scattering and emitting the transmitted light, and which is disposed side by side with the reflective volume hologram 2, thus allowing the wavelength to be observed easily by the second observation device 12.

Further, in the authenticity determination device 1 for the security medium 10 including the reflective volume hologram 2 according to the present embodiment, the second observation device 12 is disposed on the side opposite to the light source L with respect to the reflective volume hologram 2 and scattering transmitting member 3, thus allowing the position of the second observation device 12 to be set easily.

Further, in the authenticity determination device 1 for the security medium 10 including the reflective volume hologram 2 according to the present embodiment, the security medium 10 includes the scattering reflecting member 4 which is an opaque member, which has a function of, when light emitted from the light source L is reflected thereat, scattering and emitting the reflected light, and which is disposed side by side with the reflective volume hologram 2, thus allowing the wavelength to be observed easily by the second observation device 12.

Further, in the authenticity determination device 1 for the security medium 10 including the reflective volume hologram 2 according to the present embodiment, the light source L is disposed on the front surface side of the reflective volume hologram 2 so that a reproduction light to be irradiated is incident on the reflective volume hologram 2 from a direction other than the pre-designed diffraction direction of the reflective volume hologram 2, so that the degree of freedom of arrangement of the light source L can be increased, thus allowing the authenticity of the reflective volume hologram 2 to be determined easily.

Further, in the authenticity determination device 1 for the security medium 10 including the reflective volume hologram 2 according to the present embodiment, the light source L is disposed on the front surface side of the reflective volume hologram 2 so that a reproduction light to be irradiated is incident on the reflective volume hologram 2 from the pre-designed incident direction of the reflective volume hologram 2, thus allowing the position of the light source L to be set easily.

Further, in the authenticity determination device 1 for the security medium 10 including the reflective volume hologram 2 according to the present embodiment, the second observation device 12 is disposed in the pre-designed incident direction of the reflective volume hologram 2, allowing both the first and second observation devices 11 and 12 to be disposed on one side of the reflective volume hologram 2, so that the entire size of the authenticity determination device 1 can be reduced.

The authenticity determination method for the security medium 10 including the reflective volume hologram 2 according to the present embodiment includes a first step of moving the reflective volume hologram 2 so that the light including the pre-designed diffraction wavelength of the reflective volume hologram 2 which is emitted from the light source L and incident on the reflective volume hologram 2 is the reproduction illumination light of the reflective volume hologram 2 and observing the light from the pre-designed diffraction direction of the reflective volume hologram 2 and a second step of moving the reflective volume hologram 2 so that the light including the pre-designed diffraction wavelength of the reflective volume hologram 2 which is emitted from the light source L and incident on the reflective volume hologram 2 is transmitted through the reflective volume hologram 2 and observing the light from the side opposite to the light source L with respect to the reflective volume hologram 2. When it is determined in the first step that the light amount in the diffraction wavelength is larger than that in other wavelengths and it is determined in the second step that the light amount in the diffraction wavelength is smaller than that in other wavelengths, the reflective volume hologram 2 is determined to be genuine, thus allowing the authenticity of the reflective volume hologram 2 to be determined easily.

Further, in the authenticity determination method for the security medium 10 including the reflective volume hologram 2 according to the present embodiment, the security medium 10 includes the scattering transmitting member 3 which is a transparent member, which has a function of, when the light including the pre-designed diffraction wavelength of the reflective volume hologram 2 emitted from the light source L is transmitted therethrough, scattering and emitting the transmitted light, and which is disposed side by side with the reflective volume hologram 2, and the method includes a first step of moving the reflective volume hologram 2 so that the light including the pre-designed diffraction wavelength of the reflective volume hologram 2 which is emitted from the light source L and incident on the reflective volume hologram 2 is the reproduction illumination light of the reflective volume hologram 2 and observing the light from the pre-designed diffraction direction of the reflective volume hologram 2 and a second step of moving the reflective volume hologram 2 so that the light which is emitted from the light source L which is a white light source and incident on the reflective volume hologram 2 is transmitted through the reflective volume hologram 2 and observing the light from the side opposite to the light source L with respect to the reflective volume hologram 2. When it is determined in the first step that the light amount in the diffraction wavelength is larger than that in other wavelengths and it is determined in the second step that the light amount in the diffraction wavelength is smaller than that in other wavelengths, the reflective volume hologram 2 is determined to be genuine, thus allowing the authenticity of the reflective volume hologram 2 to be determined easily.

Further, in the authenticity determination method for the security medium 10 including the reflective volume hologram 2 according to the present embodiment, the security medium 10 includes the scattering reflecting member 4 which is an opaque member, which has a function of, when the light including the pre-designed diffraction wavelength of the reflective volume hologram 2 emitted from the light source L is reflected thereat, scattering and emitting the reflected light, and which is disposed side by side with the reflective volume hologram 2, and the method includes a first step of observing, from the pre-designed diffraction direction of the reflective volume hologram 2, the light which is emitted from the light source L in the pre-designed incident direction of the reproduction illumination light of the reflective volume hologram 2 and a second step of observing, from the pre-designed incident direction of the reproduction illumination light of the reflective volume hologram 2, the light which is emitted from the light source L in the pre-designed incident direction of the reproduction illumination light of the reflective volume hologram 2. When it is determined in the first step that the light amount in the diffraction wavelength is larger than that in other wavelengths and it is determined in the second step that the light amount in the diffraction wavelength is smaller than that in other wavelengths, the reflective volume hologram 2 is determined to be genuine, thus allowing the authenticity of the reflective volume hologram 2 to be determined easily.

Further, in the authenticity determination method for the security medium 10 including the reflective volume hologram 2 according to the present embodiment, the second step observes, from the pre-designed incident direction of the reproduction illumination light of the reflective volume hologram 2, light emitted from the light source L other than that in the emission direction of a diffracted light when the pre-designed reproduction illumination light of the reflective volume hologram 2 is incident on the reflective volume hologram 2, so that the degree of freedom of arrangement of the light source L can be increased, thus allowing the authenticity of the reflective volume hologram 2 to be determined easily.

Further, the security medium 10 including the reflective volume hologram 2 according to the present embodiment includes the transparent reflective volume hologram 2 and the scattering transmitting member 3 which is a transparent member, which has a function of, when the light emitted from the light source L is transmitted therethrough, scattering and emitting the transmitted light, and which is disposed side by side with the reflective volume hologram 2 on the side opposite to the light source L with respect to the reflective volume hologram 2, thus allowing a member capable of easily determining the authenticity of the reflective volume hologram 2 to be formed.

Further, the security medium 10 including the reflective volume hologram 2 according to the present embodiment includes the reflective volume hologram 2 and the scattering reflecting member 4 which is an opaque member, which has a function of, when the light emitted from the light source L is reflected thereat, scattering and emitting the reflected light, and which is disposed side by side with the reflective volume hologram 2 on the side opposite to the light source L with respect to the reflective volume hologram 2, thus allowing a member capable of easily determining the authenticity of the reflective volume hologram 2 to be formed.

While the authenticity determination device and method for a security medium including a reflective volume hologram, and the security medium including a reflective volume hologram have been described with reference to the several embodiments, the present invention is not limited to the embodiments, and various combinations and modifications thereof are possible.

REFERENCE SIGNS LIST

1: Authenticity determination device
2: Reflective volume hologram
3: Scattering transmitting member
4: Scattering reflecting member
11: First observation device
12: Second observation device
10: Security medium
L: Light source

The invention claimed is:

1. An authenticity determination device that determines authenticity of a security medium including a reflective volume hologram, which has a selectivity range having a peak at a pre-designed diffraction wavelength, comprising:
   a light source disposed on a front surface side of the reflective volume hologram so that light emitted therefrom is incident on the reflective volume hologram from a pre-designed incident direction of a reproduction illumination light of the reflective volume hologram;
   a first observation device disposed in a pre-designed diffraction direction of the reflective volume hologram; and
   a second observation device disposed in a direction in which light emitted from the light source goes straight and is then transmitted through the reflective volume hologram, wherein
   light including the pre-designed diffraction wavelength is emitted from the light source to be incident on the reflective volume hologram, and at this time, when the light amount observed in the first observation device is proportional to the selectivity range having the peak at the pre-designed diffraction wavelength of the reflective volume hologram such that the light amount is largest at the pre-designed diffraction wavelength as compared to other wavelengths adjacent to the pre-designed diffraction wavelength, and the light amount observed in the second observation device is inversely proportional to the selectivity range having the peak at the pre-designed diffraction wavelength of the reflective volume hologram such that the light amount is smallest at the pre-designed diffraction wavelength as compared to other wavelengths adjacent to the pre-designed diffraction wavelength, it is determined that the reflective volume hologram is genuine.

2. The authenticity determination device for a security medium including a reflective volume hologram according to claim 1, wherein
   the security medium includes a scattering transmitting member which is a transparent member, which has a function of, when light emitted from the light source is transmitted therethrough, scattering and emitting the transmitted light, and which is disposed side by side with the reflective volume hologram.

3. The authenticity determination device for a security medium including a reflective volume hologram according to claim 2, wherein
   the second observation device is disposed on a side opposite to the light source with respect to the reflective volume hologram and the scattering transmitting member.

4. The authenticity determination device for a security medium including a reflective volume hologram according to claim 1, wherein
   the security medium includes a scattering reflecting member which is an opaque member, which has a function of, when light emitted from the light source is reflected thereat, scattering and emitting the reflected light, and which is disposed side by side with the reflective volume hologram.

5. The authenticity determination device for a security medium including a reflective volume hologram according to claim 4, wherein
the light source is disposed on the front surface side of the reflective volume hologram so that a reproduction light to be irradiated is incident on the reflective volume hologram from a direction other than a pre-designed diffraction direction of the reflective volume hologram.

6. The authenticity determination device for a security medium including a reflective volume hologram according to claim 4, wherein
the light source is disposed on the front surface side of the reflective volume hologram so that a reproduction light to be irradiated is incident on the reflective volume hologram from the pre-designed incident direction of the reflective volume hologram.

7. The authenticity determination device for a security medium including a reflective volume hologram according to claim 5, wherein
the second observation device is disposed in the pre-designed incident direction of the reflective volume hologram.

8. An authenticity determination method of determining the authenticity of a security medium including a reflective volume hologram, which has a selectivity range having a peak at a pre-designed diffraction wavelength, comprising:
a first step of moving the reflective volume hologram so that light including the pre-designed diffraction wavelength of the reflective volume hologram which is emitted from a light source and incident on the reflective volume hologram is a reproduction illumination light of the reflective volume hologram and observing the light from a pre-designed diffraction direction of the reflective volume hologram; and
a second step of moving the reflective volume hologram so that light including the pre-designed diffraction wavelength of the reflective volume hologram which is emitted from the light source and incident on the reflective volume hologram is transmitted through the reflective volume hologram and observing the light from a side opposite to the light source with respect to the reflective volume hologram, wherein
when it is determined in the first step that the light amount in the pre-designed diffraction wavelength is proportional to the selectivity range having the peak at the pre-designed diffraction wavelength of the reflective volume hologram such that the light amount is largest at the pre-designed diffraction wavelength as compared to other wavelengths adjacent to the pre-designed diffraction wavelength and it is determined in the second step that the light amount in the pre-designed diffraction wavelength is inversely proportional to the selectivity range having the peak at the pre-designed diffraction wavelength of the reflective volume hologram such that the light amount is smallest at the pre-designed diffraction wavelength as compared to other wavelengths adjacent to the pre-designed diffraction wavelength, the reflective volume hologram is determined to be genuine.

9. The authenticity determination method for a security medium including a reflective volume hologram according to claim 8, wherein
the second step observes, from a pre-designed incident direction of the reproduction illumination light of the reflective volume hologram, light emitted from the light source other than that in an emission direction of a diffracted light when the pre-designed incident direction of the reproduction illumination light of the reflective volume hologram is incident on the reflective volume hologram.

10. An authenticity determination method of determining the authenticity of a security medium including a reflective volume hologram, which has a selectivity range having a peak at a pre-designed diffraction wavelength, in which the security medium includes a scattering transmitting member which is a transparent member, which has a function of, when light including the pre-designed diffraction wavelength of the reflective volume hologram emitted from a light source is transmitted therethrough, scattering and emitting the transmitted light, and which is disposed side by side with the reflective volume hologram,
the method comprising:
a first step of moving the reflective volume hologram so that the light including the pre-designed diffraction wavelength of the reflective volume hologram which is emitted from the light source and incident on the reflective volume hologram is a reproduction illumination light of the reflective volume hologram and observing the light from a pre-designed diffraction direction of the reflective volume hologram; and
a second step of moving the reflective volume hologram so that the light which is emitted from the light source which is a white light source and incident on the reflective volume hologram is transmitted through the reflective volume hologram and observing the light from a side opposite to the light source with respect to the reflective volume hologram, wherein
when it is determined in the first step that the light amount in the pre-designed diffraction wavelength is proportional to the selectivity range having the peak at the pre-designed diffraction wavelength of the reflective volume hologram such that the light amount is largest at the pre-designed diffraction wavelength as compared to other wavelengths adjacent to the pre-designed diffraction wavelength and it is determined in the second step that the light amount in the pre: designed diffraction wavelength is inversely proportional to the selectivity range having the peak at the pre-designed diffraction wavelength of the reflective volume hologram such that the light amount is smallest at the pre-designed diffraction wavelength as compared to other wavelengths adjacent to the pre-designed diffraction wavelength, the reflective volume hologram is determined to be genuine.

11. A security medium including a reflecting volume hologram, comprising:
a transparent reflective volume hologram, the reflective volume hologram is configured to have a selectivity range having a peak at a pre-designed diffraction wavelength; and
a scattering transmitting member which is a transparent member, which has a function of, when light emitted from a light source is transmitted therethrough, scattering and emitting the transmitted light, and which is disposed side by side with the reflective volume hologram on a side opposite to the light source with respect to the reflective volume hologram, such that when light from the light source, which includes the pre-designed diffraction wavelength, is irradiated on a front surface side of the reflective volume hologram at a predetermined incident angle on the front surface side of the reflective volume hologram,
the reflective volume hologram is configured to emit light from the front surface side that is proportional to the selectivity range having the peak at the pre-designed diffraction wavelength of the reflective volume hologram, wherein the light amount is largest at the pre-designed diffraction wavelength as compared to other wavelengths adjacent to the pre-designed diffraction wavelength, such that a color of the pre-designed diffraction wavelength is emitted from the front surface side, and the reflective volume hologram is configured to emit light from a rear surface side that is inversely proportional to the selectivity range having the peak at the pre-designed diffraction wavelength of the reflective volume hologram, wherein the light amount is smallest at the pre-designed diffraction wavelength as compared to other wavelengths adjacent to the pre-designed wavelength, such that the color of the pre-designed diffraction wavelength is lost and a complimentary color to the pre-designed diffraction wavelength is emitted from the rear surface side which is the side opposite to the light source with respect to the reflective volume hologram, to determine that the reflective volume hologram is genuine.

12. The security medium according to claim 11, wherein the scattering transmitting member is in direct contact with the reflective volume hologram.

* * * * *